United States Patent [19]
Myers

[11] Patent Number: 5,733,066
[45] Date of Patent: Mar. 31, 1998

[54] APPARATUS AND METHOD FOR DISPOSAL OF NUCLEAR AND OTHER HAZARDOUS WASTES

[76] Inventor: Lawrence S. Myers, 1128 Harrogate Dr., Knoxville, Tenn. 37923

[21] Appl. No.: 222,827

[22] Filed: Apr. 5, 1994

Related U.S. Application Data

[63] Continuation-in-part of Ser. No. 944,888, Sep. 14, 1992, abandoned.

[51] Int. Cl.$^6$ ........................................ B09B 5/00
[52] U.S. Cl. ............................ 405/128; 588/250
[58] Field of Search .................... 976/DIG. 343, 976/DIG. 344, DIG. 348, DIG. 350; 250/506.1, 507.1; 405/128, 129, 228; 588/250, 249; 376/372; 114/295

[56] References Cited

U.S. PATENT DOCUMENTS

| | | | |
|---|---|---|---|
| 3,035,285 | 5/1962 | Squires | 114/295 |
| 3,659,108 | 4/1972 | Quase | 250/108 FS |
| 4,328,423 | 5/1982 | Lorenzo et al. | 250/506 |
| 4,377,509 | 3/1983 | Haynes et al. | 252/633 |
| 4,404,666 | 9/1983 | Stevens et al. | 114/295 X |
| 4,486,512 | 12/1984 | Tozawa et al. | 428/623 |
| 4,532,428 | 7/1985 | Dyck et al. | 250/507.1 |
| 4,619,218 | 10/1986 | Kenny | 405/228 |
| 4,632,778 | 12/1986 | Lehto et al. | 252/629 |
| 4,636,475 | 1/1987 | Price et al. | 976/DIG. 344 |
| 4,751,040 | 6/1988 | Poppendick | 376/272 |
| 4,877,353 | 10/1989 | Wisotsky, Sr. | 405/128 |

OTHER PUBLICATIONS

The Perry Tritech Ulysses System, patent pending, Perry Tritech, Inc.
"Nulear Power and Radioactive Waste–A Sub-Sealed Disposal Option!" D.A. Deese, pp. 10–15, 1978.

*Primary Examiner*—David H. Corbin
*Attorney, Agent, or Firm*—Pitts & Brittian

[57] ABSTRACT

A hazardous waste containment vessel, and a method for its use, for safe, permanent disposal of hazardous waste in deep ocean pelagic sediment. The hazardous waste containment vessel is dropped into deep ocean water, descends through the water and penetrates the deep ocean pelagic sediment, thus burying the hazardous waste containment vessel in deep ocean pelagic sediment. The hazardous waste containment vessel has an elongated laminar walled container having first and second ends. The first end tapers to an apex having an angle selected to enhance penetration of the deep ocean pelagic sediment by the hazardous waste containment vessel. A dense filler material is carried within the elongated laminar walled container and isolates at least one hazardous waste containing drum member that is suspended within the dense filler material, from the interior layer of the elongated container member and from additional drum members suspended within the dense filler material. At least one fin member is carried by the second end of the laminar walled container for imparting hydrodynamic stability to the hazardous waste containment vessel during vertical descent through deep ocean water. To ensure adequate penetration, the containment vessel is provided with a self-arming and disarming explosive charge.

9 Claims, 2 Drawing Sheets

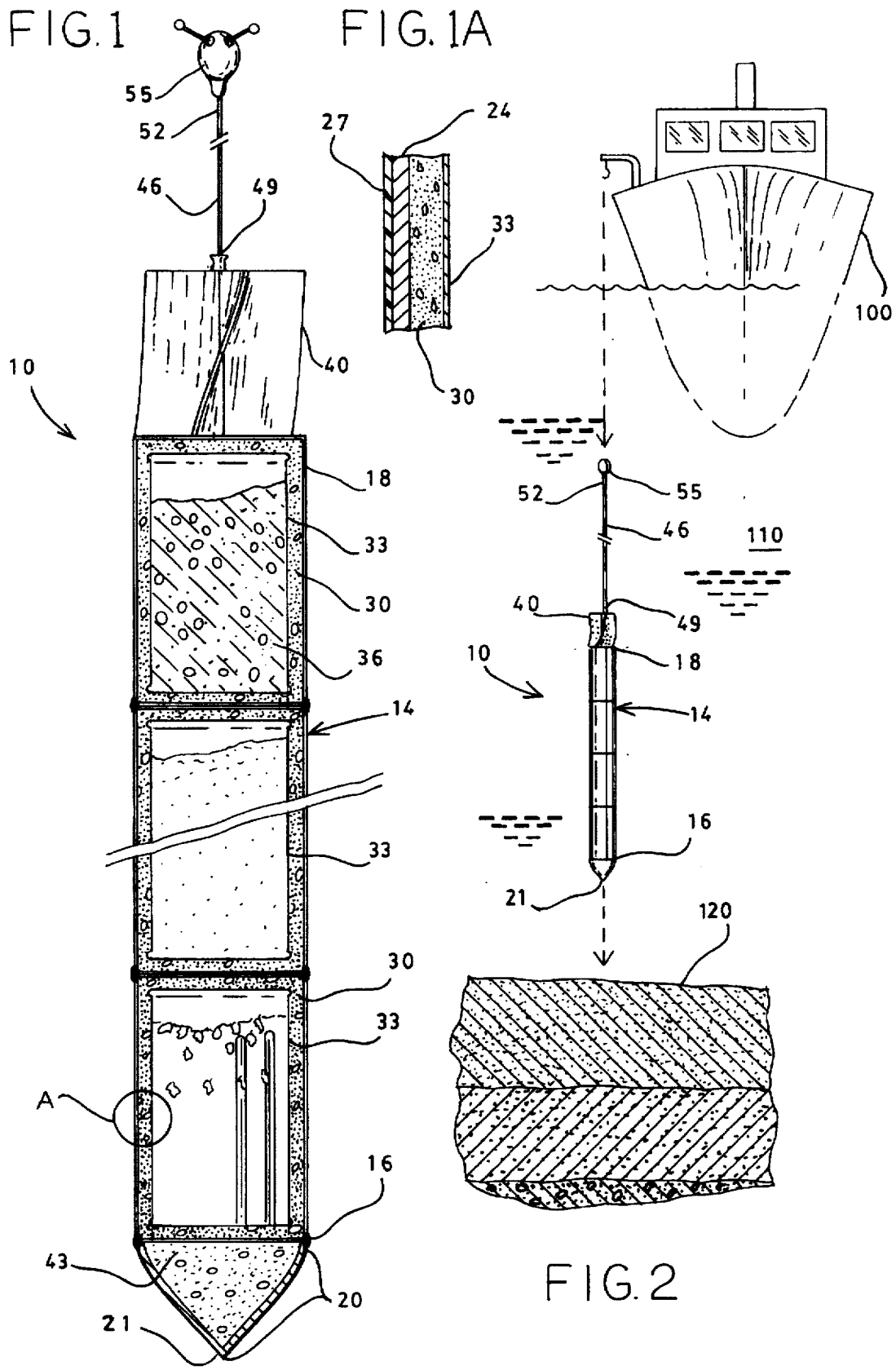

APPARATUS AND METHOD FOR DISPOSAL OF NUCLEAR AND OTHER HAZARDOUS WASTES

This application in part discloses and claims subject matter disclosed in Disclosure Document, Ser. No. 311,547 filed in the Patent and Trademark Office on Jun. 1, 1992. Further, this is a continuation-in-part application that discloses and claims subject matter disclosed in the earlier filed application, Ser. No. 07/944,888, filed Sep. 14, 1992, now abandoned.

TECHNICAL FIELD

This invention relates to the field of disposal of nuclear and other hazardous wastes. More particularly it relates to an apparatus for permanently and safely disposing of nuclear and other hazardous wastes in deep ocean pelagic sediment and a method for using the same.

BACKGROUND ART

The disposal of high and low level nuclear waste, as well as other hazardous materials has been the subject of much study, but the problem remains an intransigent problem of immense magnitude threatening future generations of mankind. In the past, low level hazardous wastes were routinely dumped on the ocean floor in fifty-five gallon steel drums. This practice was halted in the 1970's after some of the drums corroded and ruptured, releasing radioactive waste into ocean waters. Numerous methods and devices have been developed and are now in use in continental land areas which allow temporary storage of nuclear and other hazardous wastes pending development of an effective and reliable method for safe, permanent disposal of this growing volume of nuclear and other hazardous wastes.

Permanent disposal of nuclear waste by geologic isolation in geologically stable subterranean bedrock at depths of at least one thousand feet has also been studied. This method, however, requires costly mine construction and ventilation as well as safety measures to ensure the safety of the personnel at work within the mines, but the long-term safety and reliability of this method is still being questioned because of the possibility, if not probability, of future seismic disturbances. What is needed is a safe, effective, low cost apparatus for permanently disposing of nuclear waste within deep ocean pelagic sediment and a method for using the same.

Disposal of radioactive wastes in deep ocean pelagic sediments has also been studied. Various methods for such disposal are disclosed in D. A. Deese "Nuclear Power and Radioactive Waste—A Sub-Seabed Disposal Option" figures 1–5, pp. 12–13 (1978). In various methods disclosed by Deese, holes are drilled into the seabed and canisters of radioactive material are placed within the hole. These methods involve expensive ocean drilling techniques. Another method disclosed by Deese involves a free-falling ballistic shaped penetrometer that is released into the ocean or can be lowered by a winch and released far enough above the seabed to reach the velocity needed to penetrate to a depth sufficient to ensure longterm safety. However, Deese does not disclose any means of providing hydrodynamic stability to the device. Nor does Deese disclose a means of insuring that the device penetrates the seabed to the required depth. Additionally, the Deese disclosure does not disclose any means of insuring that the penetrometer does not leak or rupture in situ. The Deese reference merely discloses "a streamlined, ballistic-shaped container", as stated at page 13, last line. What is needed is a device to overcome the deficiencies of the known art by providing, at relatively-inexpensive cost, an apparatus that will insure self-injection into pelagic sediments in the stable environment of deep ocean abyssal plains far from seismic or populated areas and that is provided with a tethered line calibrated for visual verification of depth penetrated and an attached remote monitoring system to detect leaking of radioactivity due to physical rupture. Such a device, over the course of geologic time, will become encased in solid rock, thus providing the permanent disposal and longterm safety sought by government officials.

Accordingly, it is an object of this invention to provide an apparatus capable of self-injection into pelagic sediments in the stable environment of deep ocean abyssal plains far from seismic or populated areas for safely and permanently disposing of nuclear waste within deep ocean pelagic sediment inexpensively.

It is a further object of the present invention to provide an apparatus for permanently disposing of nuclear waste within deep ocean pelagic sediment that significantly reduces and preferably eliminates the risk of contamination of the deep ocean pelagic sediment and ocean waters with nuclear and other hazardous wastes.

Yet another object of the present invention is to provide an apparatus that includes a tethered line calibrated for visual verification of depth penetrated and an attached remote monitoring system to detect leaking of radioactivity due to physical rupture.

Still another object of the present invention is to provide a method of permanently disposing of nuclear and other hazardous wastes in deep ocean pelagic sediment utilizing the disclosed apparatus.

Other objects and advantages over the prior art will become apparent to those skilled in the art upon reading the detailed description together with the drawings described as follows.

DISCLOSURE OF THE INVENTION

In accordance with the various features of this invention, a hazardous waste containment vessel for permanently disposing of nuclear and other hazardous wastes, (collectively referred to herein as "hazardous waste"), in deep ocean pelagic sediment and a method for disposing of hazardous waste in deep ocean pelagic sediment is provided. Hazardous waste is first vitrified or mixed with inert compounds such as concrete or ceramics in order to create a solid, dehydrated mass that is then encapsulated in the containment vessel. The containment vessel is a torpedo-shaped vessel having a pointed end and fins to stabilize its descent through water. The containment vessel has an elongated container member having a thick air-tight, high-density, lead-impregnated, impact resistant and corrosion-resistant laminar walled construction so as to be impervious to hydrologic penetration and leaching of the hazardous waste material. The containment vessel is then deployed into the ocean, preferably into the abyssal plains beyond the continental shelf. The containment vessel descends to the bottom of the ocean floor by the force of gravity; its velocity causes the containment vessel to penetrate the deep ocean pelagic sediment on the ocean floor, completely burying the containment vessel. The containment vessel is self-injecting and is provided with a self-arming and disarming propellant to ensure complete burial. Thereafter, over time, continuous deposition of deep ocean pelagic sediments will further bury the hazardous waste containment vessel by increasing the sediment overburden.

BRIEF DESCRIPTION OF THE DRAWINGS

The above mentioned features of the invention will become more clearly understood from the following detailed description of the invention read together with the drawings in which:

FIG. 1 illustrates a cross-sectional view of the hazardous waste containment vessel of the present invention.

FIG. 1A illustrates an enlarged view of the laminar container member taken at circle A in FIG. 1.

FIG. 2 illustrates an elevational view of the hazardous waste containment vessel of the present invention as it descends through ocean water.

BEST MODE FOR CARRYING OUT THE INVENTION

Figure 3:
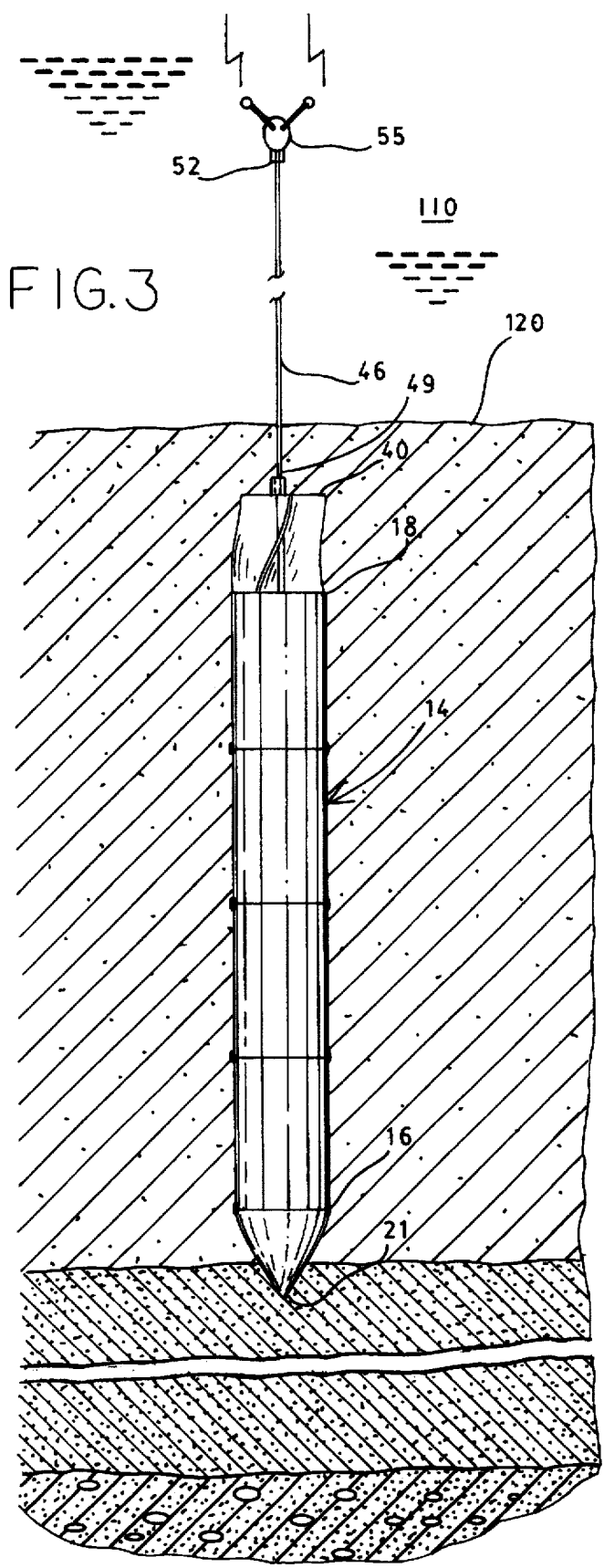
FIG. 3 illustrates an elevational view of the hazardous waste containment vessel of the present invention after the hazardous waste containment vessel has penetrated the deep ocean pelagic sediment.
Figure 4:
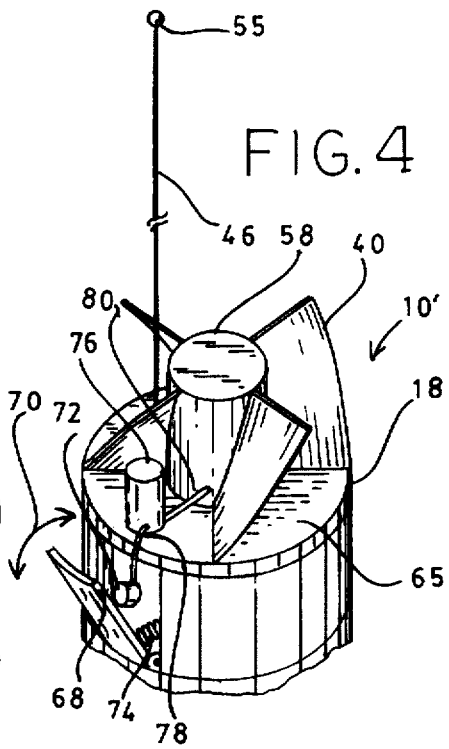
FIG. 4 illustrates a perspective view of the hazardous waste containment vessel as provided with a self-arming and disarming explosive charge to insure adequate depth penetration in an alternate embodiment.

Permanent disposal of hazardous waste, such as, though not limited to, high and/or low yield nuclear waste, by burial of the hazardous waste in the deep ocean pelagic sediment on the ocean floor is described first in terms of a description of a preferred hazardous waste containment vessel and second in terms of the preferred method of its use. A hazardous waste containment vessel for permanently disposing of hazardous waste in deep ocean pelagic sediment, constructed in accordance with the teachings of the present invention is illustrated generally as 10 in the Figures. Hazardous waste containment vessel 10 is constructed so as to enhance hydrodynamic stability of hazardous waste containment vessel 10 in ocean water 110, thereby providing a stable descent through the ocean and into deep ocean pelagic sediment 120.

As seen in FIGS. 1 and 1A, hazardous waste containment vessel 10 has an elongated laminar walled container 14 having a first end 16 and a second end 18. The first end 16 of hazardous waste containment vessel 10 has a tapered section 20 that tapers to an apex 21 which has an angle that is selected to enhance penetration of deep ocean pelagic sediment 120 by hazardous waste containment vessel 10. Elongated laminar walled container 14 has at least an interior layer 24 constructed of a metal, and an air-tight and liquid-tight exterior layer 27 constructed of a dense synthetic resin, which in an alternate embodiment can be impregnated with lead. This laminar construction is preferably impact resistant and provides an elongated container that is most preferably liquid tight and air impermeable, or air tight. Additionally, in the preferred embodiment each layer of laminar walled container 14 is corrosion-proof. This serves a dual purpose of preventing leakage or leaching of hazardous waste 36, contained therein, into the water 110 above the deep ocean pelagic sediment 120 as well as preventing saturation of hazardous waste containment vessel 10 with sea water and concomitant corrosion of hazardous waste containment vessel 10.

A dense filler material 30 is carried within said elongated laminar walled container. Dense filler material 30 is preferably a high density concrete; however, in an alternate embodiment, dense filler material 30 is a high density vitreous material. At least one drum member 33 is loaded with hazardous waste 36 and suspended within dense filler material 30. Drum member 33 is preferably constructed of an air and liquid impermeable and corrosion-proof material. Preferably, a plurality of drum members 33 are stacked end to end within elongated laminar walled container 14. Each drum member 33 is isolated from the interior layer 24 and from the other drum members 33 of said hazardous waste containment vessel by dense filler material 30.

In order to further enhance the hydrodynamic stability of hazardous waste containment vessel 10 as it descends through ocean water 110, at least one fin member 40 is carried by the second end 18 of elongated laminar walled container 14 and ballast 43 is carried within tapered section 20 of first end 16 of elongated laminar walled container 14. Fin member 40 imparts spin and vertical stability to hazardous waste containment vessel 10. Ballast 43, which is preferably high density concrete, lowers the center of gravity of hazardous waste containment vessel 10 so as to maintain hazardous waste containment vessel 10 in a selected vertical orientation as said hazardous waste containment vessel 10 descends through ocean water 110.

In the preferred embodiment, hazardous waste containment vessel 18 also has an elongated tether member 46 having a first end 49 that is secured to the second end 18 of elongated laminar walled container 14 and a further end 52. Tether member 46 can be calibrated to aid in visual inspection and verification of penetration to required depth by providing incremented alternating color bands. A contamination monitoring member 55 is secured to further end 52 of elongated tether member 46 for monitoring the surrounding deep ocean pelagic water and for detecting leakage and/or leaching of said hazardous waste into surrounding deep ocean pelagic water. This information is transmitted to a surface-stationed monitor (not shown).

In the preferred embodiment, hazardous waste containment vessel 10 gains sufficient velocity during the descent through ocean water 110 to penetrate deep ocean pelagic sediment 120 and be completely buried in deep ocean pelagic sediment 120 by the accelerational force of gravity alone. However, an alternate embodiment is provided to ensure that hazardous waste containment vessel 10 penetrates deep ocean pelagic sediment 120 sufficiently to ensure complete burial.

In this alternate embodiment, hazardous waste containment vessel 10', is provided with an explosive charge 58, that is preferably self-arming and disarming, which will detonate to provide additional velocity to enhance penetration of deep ocean pelagic sediment by hazardous waste containment vessel 10'. In this regard, an armored-steel plate 65 is disposed on the end of the second end 18 of elongated laminar walled container 14 in order to prevent rupture and damage to containment vessel 10'. A trigger member 68 is pivotally connected to the second end 18 of elongated laminar walled container 14. Trigger member 68 pivots in the direction of arrow 70. A switch 72 is positioned on the second end 18 of elongated laminar walled container 14 such that trigger member 68 depresses switch 72 when trigger member 68 is pivoted upward against the second end 18 of elongated laminar walled container 14. A spring 74 is provided to pivotally bias trigger member 68 away from the second end 18 of elongated laminar walled container 14 in a deployed position.

A control unit 76 is carried by hazardous waste containment vessel 10' and is wired to switch 72 by electrical connection 78 and to explosive charge 58 by electrical connection 80. Control unit 76 detonates explosive charge 58 in order to provide additional velocity to hazardous waste containment vessel 10' thereby enhancing penetration of deep ocean pelagic sediment. Control unit 76 can be configured to commence detonation either at a predetermined depth or after a predetermined amount of time from launch and can also disarm explosive charge 58 in the event that hazardous waste containment vessel 10' self-injects to a sufficient depth.

Figure 5:
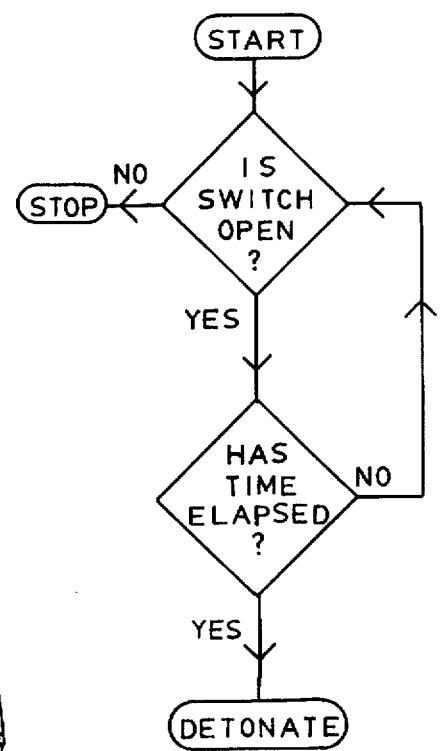
FIG. 5 illustrates a flow-chart showing the detonation sequence of the self-arming and disarming explosive charge of the alternate embodiment depicted in FIG. 4.

In this regard, trigger member 68 and switch 72 are provided in order to prevent detonation of explosive charge if hazardous waste containment vessel 10' has been embedded at a sufficient depth in sediment of sufficient density to ensure complete burial. In this regard, as seen in the flowchart in FIG. 5, as long as trigger member 68 is in a deployed position, switch 72 is open. Control unit 76 has conventional processing circuitry, (not shown) which detects whether switch 72 is open or closed. When switch 72 is open, the detonation sequence can proceed. However, when hazardous waste containment vessel 10' has been embedded in sediment of sufficient density to ensure complete burial, the sediment will press trigger member 68 against switch 72 thereby closing switch 72 and interrupting the detonation sequence. In an alternate embodiment, switch 72 would simply be in the circuit between a timer (not shown) or depth gauge (not shown). In this manner when trigger member 68 is in a deployed position, switch 72 is closed to form a complete circuit. When the sediment presses trigger member 68 against switch 72, switch 72 is opened and the circuit is interrupted thus preventing detonation.

Those skilled in the art will recognize that trigger member 68 can be configured such that it serves as a fin, such as fin member 40, to enhance the hydrodynamic stability of hazardous waste containment vessel 10' as it descends through ocean water 10, by imparting spin and vertical stability to hazardous waste containment vessel 10'. Configuring trigger member 68 to impart spin and vertical stability to hazardous waste containment vessel 10' would alleviate the necessity of providing a separate fin member.

In order to utilize hazardous waste containment vessel 10 to permanently dispose of hazardous waste in deep ocean pelagic sediment, the hazardous waste must first be rendered safe for packaging, handling, transport and deposition. This is preferably accomplished by converting hazardous waste into a solid, dehydrated mass by any of several presently-known techniques, such as by mixing the hazardous waste with inert compounds, such as though not limited to concrete and ceramics. This mixture is then dehydrated and solidified by a process of either calcination, concretion, or vitrification. This not only reduces the total volume of the hazardous waste, but also stabilizes the hazardous waste for transport.

The hazardous waste 36 is then sealed into at least one, and preferably a plurality of drum members 33. After sealing, drum member 33 is most preferably air and liquid impermeable. Each drum member 33 is placed within elongated laminar walled container 14 and isolated from the interior layer 24 of elongated laminar walled container 14 and from the other drum members 33 by dense filler material 30. Hazardous waste containment vessel 10 is then sealed so as to provide additional protection from leakage and/or leaching of hazardous waste 36. In the preferred embodiment, as seen in FIGS. 2 and 3, hazardous waste containment vessel 10 is then transported out to sea and dropped from a ship 100 into deep ocean water 110, preferably into the abyssal plains beyond the continental shelf. Hazardous waste containment vessel 10 descends through deep ocean water 110 and penetrates deep ocean pelagic sediment 120, thereby burying hazardous waste containment vessel 10 in deep ocean pelagic sediment 120.

From the foregoing description, it will be recognized by those skilled in the art that a hazardous waste containment vessel, and an associated method, for permanently disposing of hazardous waste in deep ocean pelagic sediment offering advantages over the prior art has been provided. Specifically, the hazardous waste containment vessel, and its associated method of use, provides an apparatus and associated method for permanently disposing of nuclear waste within deep ocean pelagic sediment inexpensively and which significantly reduces and preferably eliminates the risk of contamination of the deep ocean pelagic sediment and ocean waters with hazardous waste.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A hazardous waste containment vessel for permanently disposing of hazardous waste in deep ocean pelagic sediment, wherein said hazardous waste containment vessel is dropped into deep ocean water and descends through said deep ocean water and penetrates said deep ocean pelagic sediment, said hazardous waste containment vessel comprising:

an elongated container defining a first end, a second end and a laminar wall, said first end defining a tapered section, said tapered section tapering to an apex at an angle to enhance penetration of said deep ocean pelagic sediment by said hazardous waste containment vessel;

a dense filler material being carried within said elongated laminar walled container;

at least one drum member being suspended within said dense filler material, said drum member containing said hazardous waste;

at least one fin member being carried by said second end of said elongated container for imparting rotation and hydrodynamic stability to said hazardous waste containment vessel during descent of said hazardous waste containment vessel through said deep ocean water;

a ballast being carried within said tapered section, said ballast for maintaining said hazardous waste containment vessel in a vertical orientation during descent through said deep ocean water; and a protective armored-steel plate disposed on said second end of said elongated container to prevent damage to said second end of said elongated container;

an explosive charge member for providing additional velocity to enhance penetration of deep ocean pelagic sediment by said hazardous waste containment vessel;

a trigger member pivotally biased away from said second end of said elongated laminar walled container in a deployed position for detecting complete burial of said hazardous waste containment vessel in pelagic sediment;

a switch positioned on said second end of said elongated laminar walled container such that said trigger member depresses said switch when said trigger member is pivoted upward against said second end of said elongated laminar walled container by pelagic sediment; and a control unit carried by said hazardous waste containment vessel and wired to said switch and to said explosive charge member for detonating said explosive charge member thereby providing additional velocity to said hazardous waste containment vessel for enhancing penetration of deep ocean pelagic sediment by said hazardous waste containment vessel, wherein said trigger member and said switch are in active association with said, control unit for disarming said explosive charge when said hazardous waste containment vessel self-injects to a depth required for complete burial of said hazardous waste containment vessel in pelagic sediment.

2. The hazardous waste containment vessel of claim 1 wherein said hazardous waste containment vessel further includes:

an elongated tether member defining a first end and a further end, said first end being secured to said second end of said elongated container; and a contamination monitoring member being secured to said further end of said elongated tether member for monitoring surrounding deep ocean pelagic water and for detecting leaching of said hazardous waste into said surrounding deep ocean pelagic water.

3. The hazardous waste containment vessel of claim 1 wherein said laminar wall of said elongated container defines an interior layer and an exterior layer, said interior layer being constructed of a metal, said exterior layer being constructed of a dense synthetic resin, said laminar wall being liquid tight, air tight, impact resistant and corrosion proof.

4. The hazardous waste containment vessel of claim 3 wherein said dense synthetic resin is impregnated with lead.

5. The hazardous waste containment vessel of claim 1 wherein said ballast is constructed of high density concrete.

6. The hazardous waste containment vessel of claim 1 wherein said dense filler material is high density concrete.

7. The hazardous waste containment vessel of claim 1 wherein said dense filler material is high density vitreous material.

8. The hazardous waste containment vessel of claim 1 wherein said hazardous waste containment vessel further includes:

an elongated tether member calibrated to aid in visual inspection and verification of penetration to required depth, said elongated tether member defining a first end and a further end, said first end being secured to said second end of said elongated container; and a contamination monitoring member being secured to said further end of said elongated tether member for monitoring surrounding deep ocean pelagic water and for detecting leaching of said hazardous waste into said surrounding deep ocean pelagic water.

9. The hazardous waste containment vessel of claim 1 wherein said hazardous waste containment vessel further includes:

an elongated tether member calibrated for visual verification of depth penetrated, said elongated tether member defining a first end and a further end, said first end being secured to said second end of said elongated container; and a contamination monitoring member being secured to said further end of said elongated tether member for monitoring surrounding deep ocean pelagic water and for detecting leaking of said hazardous waste into said surrounding deep ocean pelagic water due to physical rupture of said hazardous waste containment vessel.

* * * * *